United States Patent
Kosik et al.

[11] Patent Number: 6,093,132
[45] Date of Patent: Jul. 25, 2000

[54] AUTOMATIC CLUTCH

[75] Inventors: Franz Kosik, Ostfildern; Thomas Grass, Urbach, both of Germany

[73] Assignee: DaimlerChrysler AG, Stuttgart, Germany

[21] Appl. No.: 09/269,282

[22] PCT Filed: Sep. 18, 1997

[86] PCT No.: PCT/DE97/02147

§ 371 Date: Mar. 25, 1999

§ 102(e) Date: Mar. 25, 1999

[87] PCT Pub. No.: WO98/13618

PCT Pub. Date: Apr. 2, 1998

[30] Foreign Application Priority Data

Sep. 25, 1996 [DE] Germany ............ 196 39 292

[51] Int. Cl.[7] ............ B60K 41/28; B60K 41/02
[52] U.S. Cl. ............ 477/86; 192/3.55
[58] Field of Search ............ 477/86; 192/3.55, 192/3.62, 3.61

[56] References Cited

U.S. PATENT DOCUMENTS

| | | | |
|---|---|---|---|
| 4,674,611 | 6/1987 | Sakakiyama | 192/3.62 X |
| 5,377,797 | 1/1995 | Mustapha et al. | 192/3.55 |
| 5,626,534 | 5/1997 | Ashley et al. | 477/86 X |
| 5,964,680 | 10/1999 | Salecker et al. | 192/3.61 X |

FOREIGN PATENT DOCUMENTS

| | | |
|---|---|---|
| 0 129 417 | 12/1984 | European Pat. Off. . |
| 195 48 799 | 6/1996 | Germany . |
| WO 90/05866 | 5/1990 | WIPO . |

OTHER PUBLICATIONS

*Fichtel & Sachs AG* entitled "Geared for intelligence" IAA '93.

*Primary Examiner*—Rodney H. Bonck
*Attorney, Agent, or Firm*—Evenson, McKeown, Edwards & Lenahan, PLLC

[57] ABSTRACT

The invention concerns an automatic clutch in the drive train of a motor vehicle having a transmission with manual or voluntary selection of the different gears. After a gear-change, the engagement of the clutch is controlled as a function of the shift speed during the gear-change, such that, at high shift speeds, only a shortened clutch slip phase can occur.

10 Claims, 1 Drawing Sheet

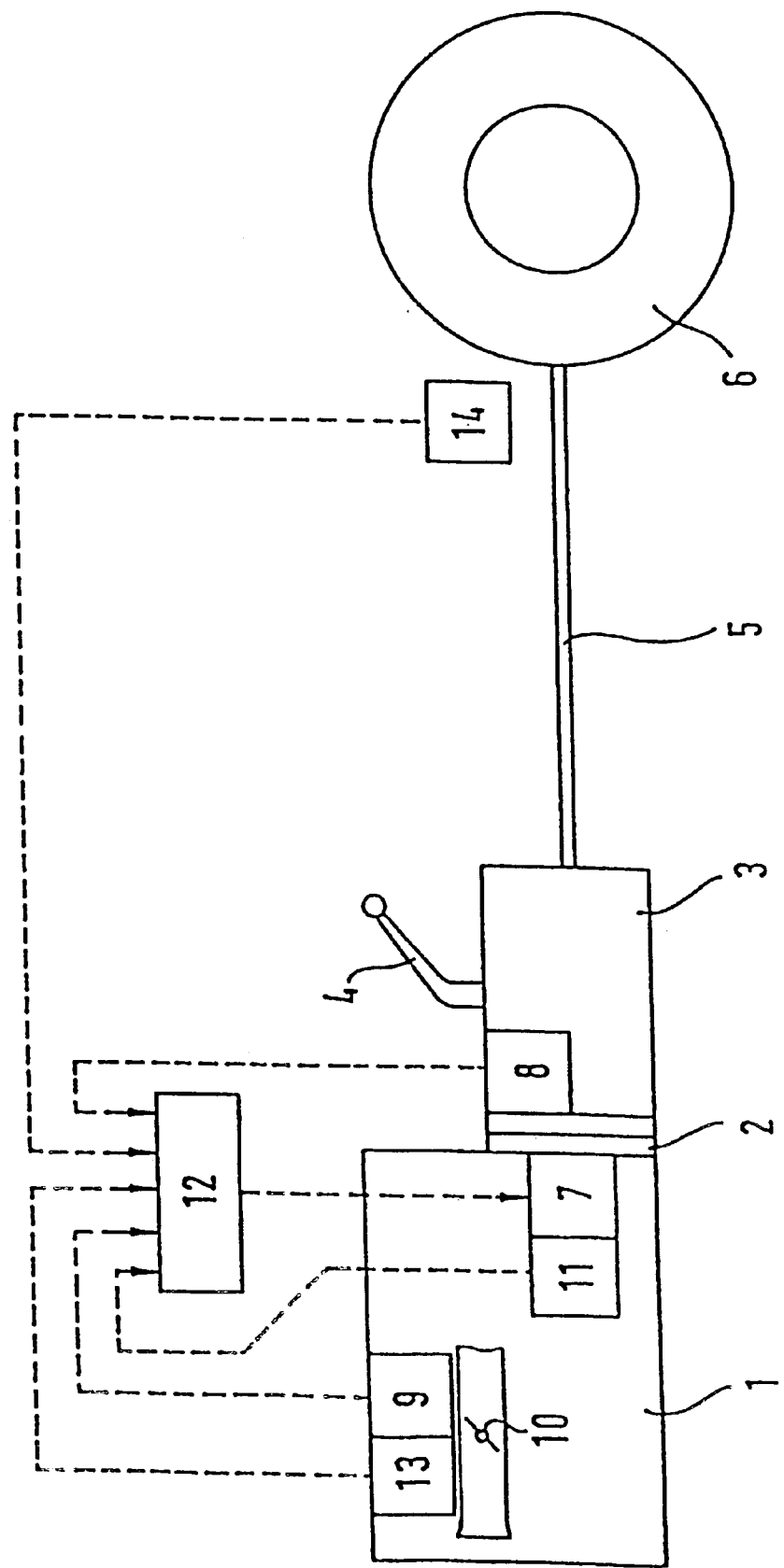

AUTOMATIC CLUTCH

BACKGROUND AND SUMMARY OF THE INVENTION

The invention concerns an automatic clutch in the drive train of a motor vehicle, which has between the engine and the drive wheels a transmission which can be shifted manually and arbitrarily between different gears or drive positions with different transmission ratios. A motorized adjusting unit actuates the clutch. A system of sensors, which serves for controlling the adjusting unit, senses a parameter correlated with the speed of a gear change or change of drive position and the signals of which initiate or control, among other things, a releasing and engaging of the clutch when the gears or transmission stages are changed.

In motor vehicles having customary internal combustion engines, a transmission is arranged in the drive train. The transmission allows the transmission ratio between the speed of the vehicle engine and the speed of the drive wheels to be changed according to the respective travelling speed and loading of the vehicle. In the case of customary manually shifted transmissions, during a change of drive position the power flow between the engine and the drive wheels has to be interrupted by releasing a clutch.

It is known in principle to use automatic clutches for this purpose, i.e. the clutch is automatically released when changing the transmission stage and is subsequently re-engaged.

It is known in this connection from German Patent document DE 195 48 799 A1 to sense a parameter controlled by the speed of a gear change in order to release the clutch particularly quickly when a shift lever or the like (actuated for the gear change) is actuated at high speed.

In addition, the clutch is also automatically controlled when starting the vehicle. As soon as a drive position suitable for starting has been selected, the clutch can, for example, be automatically engaged lightly in such a way that a small torque adequate for making the vehicle begin to slowly creep forward is transmitted. As soon as the engine power and the engine speed are increased by actuating a gas pedal or some other power control element, the clutch is automatically controlled in the sense of increasing the transmissible torque. To put it in simple terms, the clutch is then increasingly engaged.

The engaging operation of the clutch after changing gears or drive positions can, in principle, be controlled in various ways. In this connection, it has proved to be advantageous to take into account a difference in speed between the clutch input and the clutch output during the engaging phase. For this purpose, on the one hand the engine speed (determining the speed of the clutch input), and on the other hand the speeds of the drive wheels are sensed, for example. In connection with the respectively selected gear or the respectively selected transmission stage, these wheel speeds determine the speed of the output of the clutch arranged between the engine and the transmission. The signals for the engine speed are readily available because modern vehicle engines are regularly equipped with electronic controls, which have to sense the speeds of the engine to control it. The wheel speeds are regularly inquired for controlling a brake system with an anti-lock system. Consequently, for controlling the clutch it merely has to be ensured that signals for the above-mentioned parameters are also sent to the clutch control. As a result, it is consequently possible to achieve very smooth clutch engagement and, in particular, an engagement of the clutch which is free to the greatest extent from any jerking movements.

The object of the invention is thus to improve clutch control still further.

This object is achieved according to the invention by an adjusting unit which controls the engaging operation of the clutch while a gear change or change of drive position is taking place as a function of the parameter correlated with the speed of the gear change or change of drive position. This is done in such a way that a phase in which clutch slippage occurs, provided during clutch engagement, is shortened increasingly with increasing shifting speed.

The invention is based on the general idea of taking into account during clutch control whether the driver is performing a gear change or change of transmission stage quickly or slowly. Consequently, a parameter which reproduces whether the driver would like to drive in a more sporty style or with more emphasis on comfort is sensed. Depending on the shifting behavior of the driver, the engaging operation of the clutch can then be quickly controlled with more emphasis on comfort or in a more sporty manner.

A particular advantage of the invention is that, for sensing the shifting speed, only the signals of sensors which are already present in the vehicle for other reasons have to be evaluated. For instance, the transmission is regularly assigned a sensor arrangement which senses the selected gear or the selected drive position. The signals of this sensor arrangement can accordingly detect whether and when a previously selected gear or a previously selected transmission stage is left and when a gear or a transmission stage is to be selected once again. The time difference occurring between these signals is a parameter for the shifting speed.

In addition, the shifting element of the transmission may be assigned a potentiometer or the like, which senses movements of the shifting element and serves, among other things, for detecting shifting intended by the driver. The shifting speed can also be derived from the signals of the potentiometer.

According to a particularly preferred embodiment of the invention, when controlling the engaging operation of the clutch, the position of a gas pedal actuated by the driver or some other element for driver control of the driving performance is taken into account. Consequently, there is, for example, the possibility of engaging the clutch quickly after a gear change or change of drive position with a high shifting speed only if the driver wishes to make greater use of the potential power of the engine, in other words if the driver not only wishes to "shift in a sporty style" but also "drive or accelerate in a sporty style".

Otherwise, with regard to preferred features of the invention, reference is made to the claims and the following explanation of the drawing, on the basis of which a particularly advantageous embodiment is described.

BRIEF DESCRIPTION OF THE DRAWING

In the drawing, the single FIGURE shows a schematic representation of a drive train of a motor vehicle as well as the components essential for the clutch control.

DETAILED DESCRIPTION OF THE DRAWING

According to the drawing, an internal combustion engine 1 is connected in drive terms via an automatically actuated clutch 2 with a transmission 3. The drive positions or gears of the transmission are changed by manual actuation of a shift lever 4. The transmission is coupled with a drive shaft 5, for example a cardan shaft, to drive wheels 6 of a motor vehicle, otherwise not represented in any more detail.

The actuation of the clutch takes place automatically by means of a motorized adjusting unit 7. For controlling the adjusting unit 7, a system of sensors is provided for monitoring various parameters of driving operation.

This system of sensors comprises a sensor arrangement 8, which is assigned to the transmission 3 or the shift lever 4 and senses the position and/or movements of the latter. The signals of the sensor arrangement 8 thus reveal on the one hand which drive position or which gear has been selected or whether and which gear or drive position is being left. On the other hand, the signals of the sensor arrangement 8 also indicate with which speed the respective change of the gears or drive positions is taking place.

The position of an element actuated by the driver and serving for controlling the power of the engine 1, for example a throttle valve 10 of the air intake system of the engine 1, is registered by a sensor 9.

Furthermore, the system of sensors comprises a displacement pickup 11, which is assigned to the adjusting unit 7 and senses the position of the latter, and consequently a parameter which is analogous to the value of the moment which can be transmitted by the automatic clutch 2.

The control circuit 12 also communicates with an engine control 13, which has the task, among other things, of maintaining the engine speed at a minimum speed, for instance the idling speed, to the greatest extent independently of the loading of the engine. This engine control 13 can also generate signals which reproduce the respective speed of the engine 1 and the torque respectively generated by the engine 1.

The control circuit 12 otherwise communicates with speed pickups 14, which are assigned to the vehicle wheels.

On the basis of the exchange of information with the engine control 13, the control circuit 12 can determine the torque actually transmitted in each case by the clutch 2. If the moment transmitted by the clutch is denoted by $M_K$, the torque of the engine is denoted by $M_M$, the moment of inertia of the engine, predetermined by the design, is denoted by $J_m$, and the changes in speed over time of the engine are denoted by dw/dt, the following applies:

$$M_K = M_M - J_M dw/dt.$$

Since the parameters on the engine side can be signalled by the engine control 13, its signals therefore always reveal the loading of the clutch 2.

If the clutch 2 is in a slipping state, i.e. if the speeds on the input side and output side of the clutch 2 deviate from one another, the moment respectively transmitted by the clutch corresponds to the possible transmissible moment in the respective slipping phase, it being possible for this transmissible moment to be assigned to the respective position of the adjusting unit 7, sensed by the sensor 11.

The control 12 can thus constantly sense or update and store mutually assigned values for the travel of the adjusting unit 7 and the moment which can be transmitted by the clutch 2. Consequently, the control unit 12 "knows" the operating behavior of the clutch 2 and can actuate the same in principle according to any desired requirements.

The above-mentioned slippage state of the clutch 2 is sensed in that, on the one hand, the engine speed (and consequently the speed of the input of the clutch 2) is determined via the engine control 13. On the other hand, the selected gear or the selected transmission stage is determined via the sensor arrangement 8 and the speed of the drive wheels 6 is determined via the speed pickups 14. From this information, the output of the clutch 2 can be determined, taking into account the respective transmission ratio for the selected gear or the selected drive position. As a result, it can thus be established whether the input and output of the clutch 2 have the same or different speeds, i.e. whether the clutch is operating with or without is slip.

According to the invention, it is thus taken into account during the control of the clutch 2 whether a change of the gears or drive positions of the transmission 3 is taking place at a higher or lower speed. With a low shifting speed, a comparatively long slipping phase of the clutch 2 following a change of the gears or drive positions is allowed. With a high shifting speed, the slipping phase is significantly shortened. In this way, the automatic control of the clutch 2 takes place in a similarly differing way to the way in which an arbitrarily controlled clutch is actuated by a driver conscious of comfort or a sporty driver.

In addition, the position of the throttle valve 10, sensed by the sensor 9, or of another element serving for controlling the power of the engine 1, and/or the power of the engine 1 reported by the engine control 13 may also be taken into account during clutch control. As soon as it is detected here that the engine power is to be greatly increased, the slipping phase of the clutch 2 after a change of gears or drive positions is likewise shortened. On the other hand, in this way there is the possibility of dispensing with a greatly shortened slipping phase of the clutch 2 if, with a high shifting speed, the driver wishes to drive with comparatively low engine power or there is no sign of the power of the engine being increased by the driver.

What is claimed is:

1. An automatic clutch in a drive train of a motor vehicle having a transmission arranged between the engine and the drive wheels, the transmission being manually shiftable arbitrarily between different gears or drive positions with different transmission ratios, the clutch comprising:

a motorized adjusting unit which actuates the clutch;

a system of sensors which serves for controlling said adjusting unit, said sensor system sensing a parameter correlated with the speed of a gear change or change of drive position, signals of which initiate or control at least a releasing and engaging of the clutch when the gears or transmission stages are changed;

wherein the adjusting unit controls an engaging operation of the clutch while a gear change or change of drive position is taking place as a function of the parameter correlated with the speed of the gear change or change of drive position such that a slipping phase, provided during clutch engagement, is increasingly shortened with increasing shifting speed.

2. The clutch as claimed in claim 1, wherein the shifting speed is determined by evaluation of a time interval occurring during a gear change or change of drive position between leaving a gear or a drive position and reaching a gear or a drive position.

3. The clutch as claimed in claim 2, wherein a lever serving for changing the gear or the drive position is assigned a pickup for sensing the adjusting speed of the lever.

4. The clutch as claimed in claim 2, wherein a sensor is provided for an engine-power control element which is actuatable by the driver, and wherein the controlling of the engaging speed takes place additionally as a function of the power control of the engine.

5. The clutch as claimed in claim 1, wherein a lever serving for changing the gear or the drive position is assigned a pickup for sensing the adjusting speed of the lever.

6. The clutch as claimed in claim 5, wherein a sensor is provided for an engine-power control element which is actuatable by the driver, and wherein the controlling of the engaging speed takes place additionally as a function of the power control of the engine.

7. The clutch as claimed in claim 1, wherein a sensor is provided for an engine-power control element which is actuatable by the driver, and wherein the controlling of the engaging speed takes place additionally as a function of the power control of the engine.

8. A method of operating an automatic clutch in a drive train of a motor vehicle having a transmission arranged between an engine and drive wheels, said transmission being manually shiftable arbitrarily between different gears or drive positions having different transmission ratios, the method comprising the acts of:

sensing a parameter correlated with a speed of a gear change or a change of drive position, signals of which initiate or control a releasing and engaging of the clutch when the gear change or change of drive position occurs; and controlling the engaging operation of the clutch while the gear change or change of drive position takes place as a function of the sensed parameter correlated with the speed of the gear change or the change of drive position such that a slipping phase, provided during clutch engagement, is increasingly shortened with an increasing shifting speed.

9. The method according to claim 8, further comprising the act of:

determining the shifting speed by evaluating a time interval which occurs during the gear change or the change of drive position between leaving a respective gear or drive position and reaching another gear or drive position.

10. The method according to claim 9, further comprising the acts of:

sensing an engine-power control element actuatable by the driver; and controlling the engaging speed additionally as a function of the sensed engine-power control element.

* * * * *